July 19, 1949. C. W. MULLER 2,476,316
AUTOMATIC INSTRUMENT LANDING SIGNAL CONTROL
DEVICE FOR AVIATION GROUND TRAINERS
Filed March 1, 1940 5 Sheets-Sheet 1
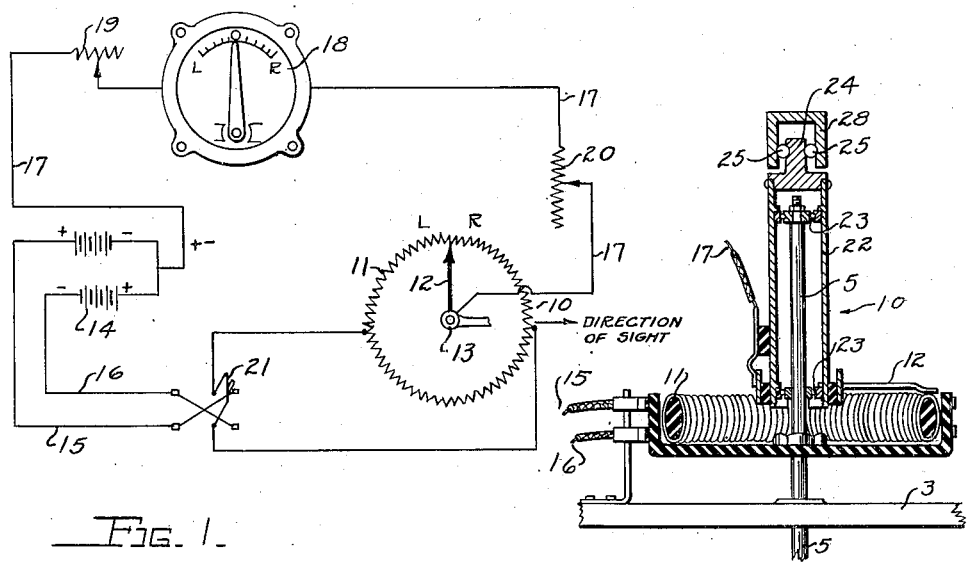
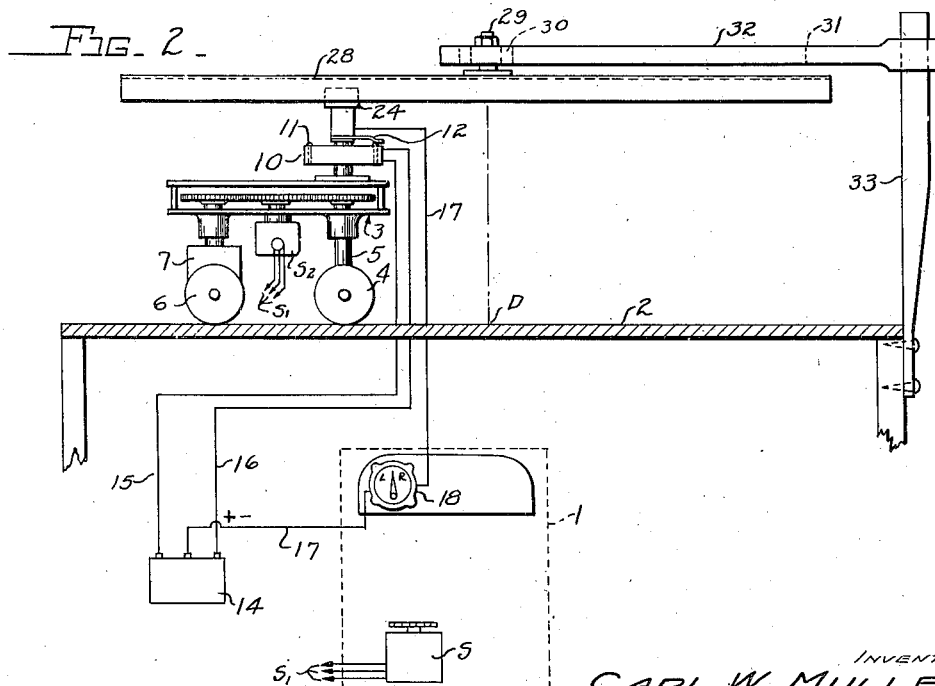
INVENTOR
CARL W. MULLER July 19, 1949.　　　　　C. W. MULLER　　　　　2,476,316
AUTOMATIC INSTRUMENT LANDING SIGNAL CONTROL
DEVICE FOR AVIATION GROUND TRAINERS
Filed March 1, 1940　　　　　　　　　　　　5 Sheets-Sheet 2
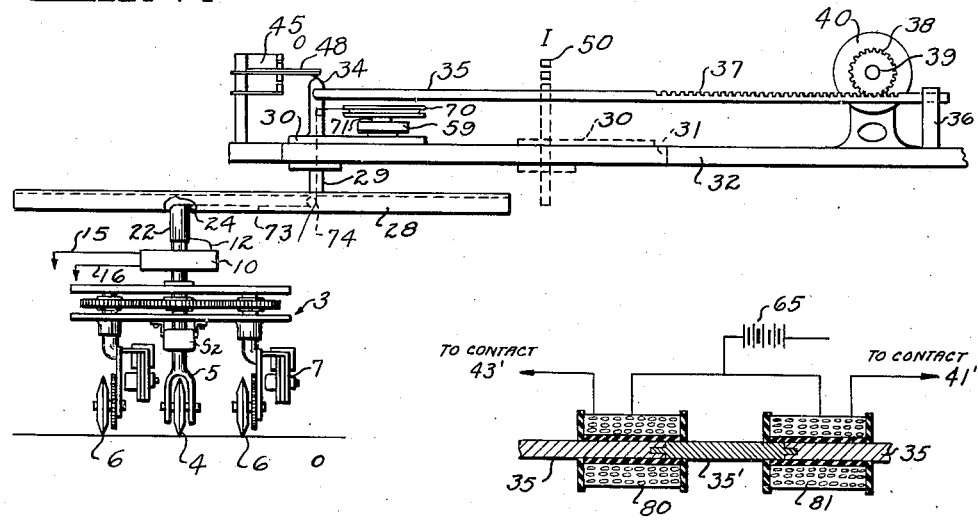
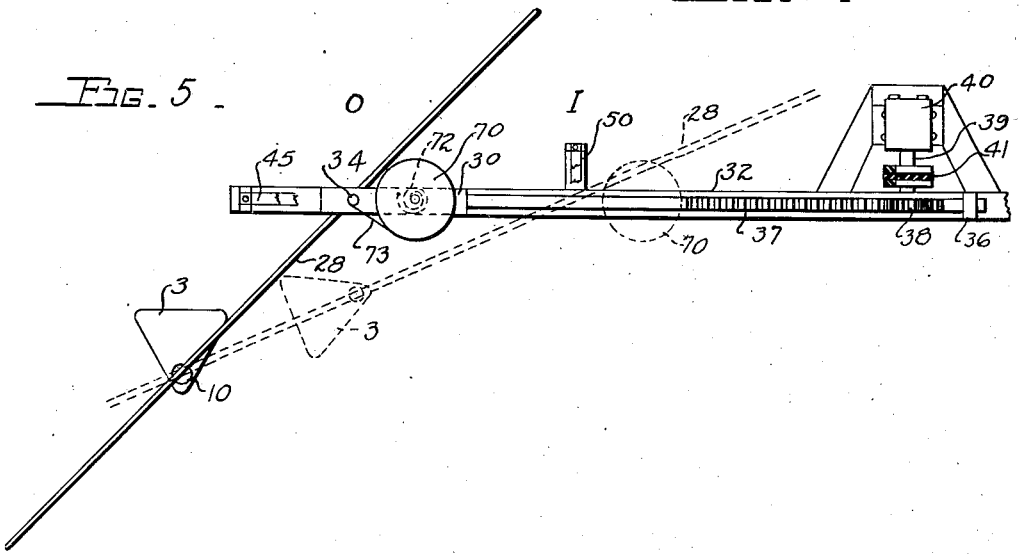
INVENTOR
CARL W. MULLER
BY
ATTORNEYS July 19, 1949.

C. W. MULLER 2,476,316

AUTOMATIC INSTRUMENT LANDING SIGNAL CONTROL
DEVICE FOR AVIATION GROUND TRAINERS

Filed March 1, 1940

INVENTOR
CARL W. MULLER
BY Wade Koontz
ATTORNEY

July 19, 1949.  C. W. MULLER  2,476,316
AUTOMATIC INSTRUMENT LANDING SIGNAL CONTROL
DEVICE FOR AVIATION GROUND TRAINERS
Filed March 1, 1940  5 Sheets-Sheet 4
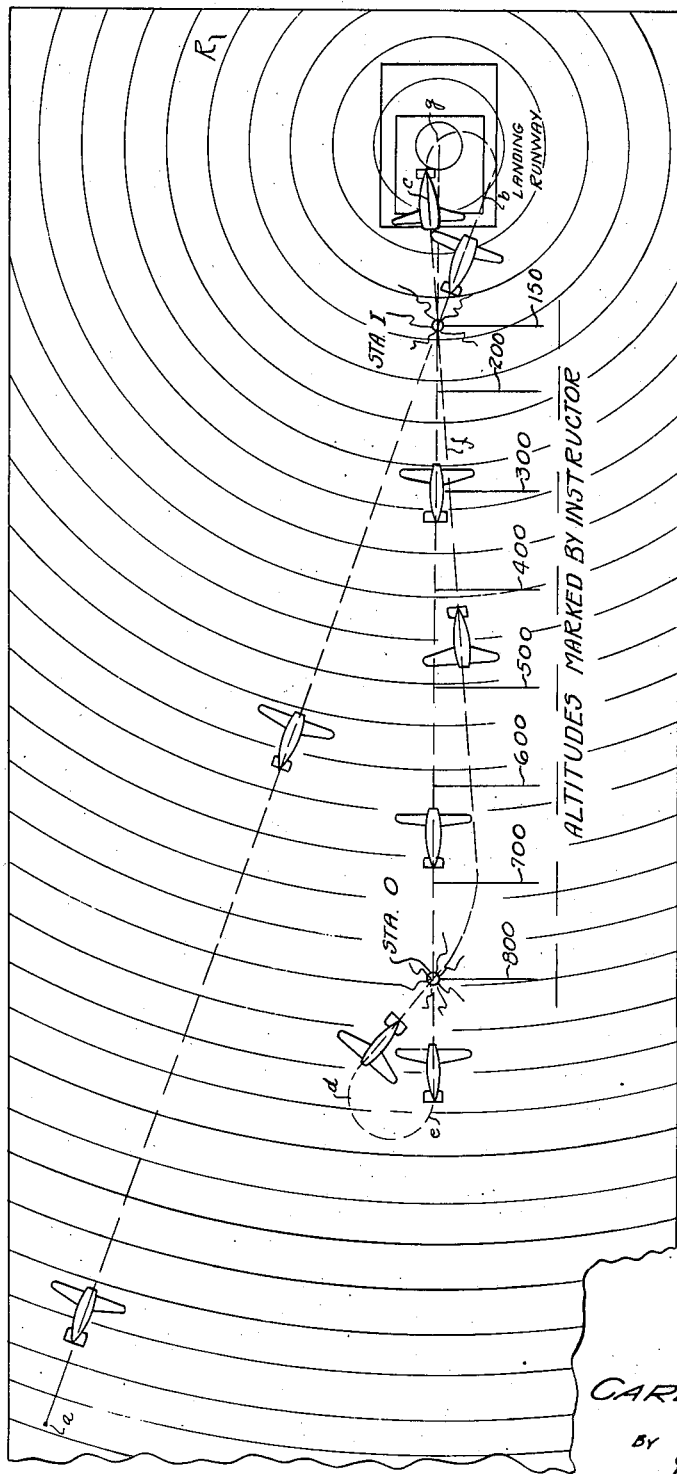
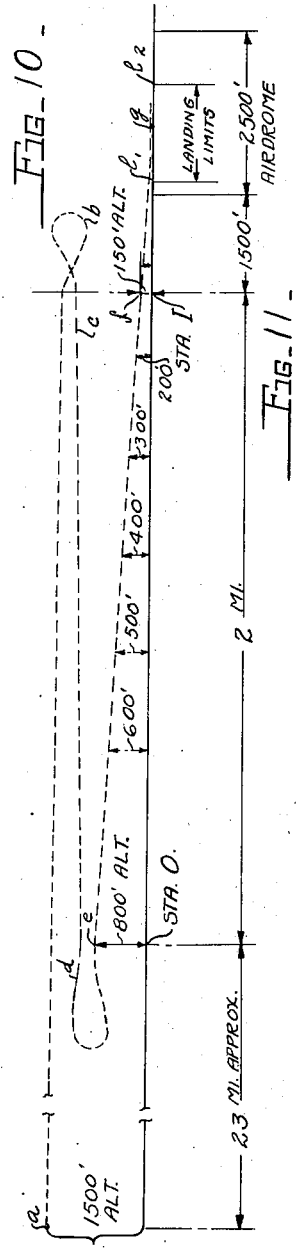
INVENTOR
CARL W. MULLER
BY Edgar H. Snodgrass
Wade Koontz
ATTORNEYS

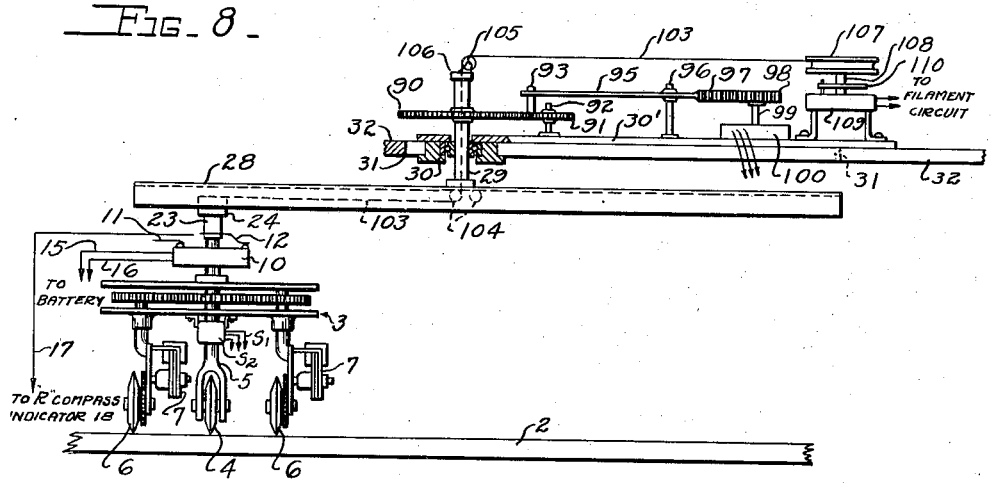

Patented July 19, 1949

2,476,316

UNITED STATES PATENT OFFICE 2,476,316

AUTOMATIC INSTRUMENT LANDING SIGNAL CONTROL DEVICE FOR AVIATION GROUND TRAINERS

Carl W. Muller, Osborn, Ohio

Application March 1, 1940, Serial No. 321,726

5 Claims. (Cl. 35—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improved auxiliary apparatus for use in combination with aviation ground trainers, and more particularly relates to an automatically operated means for simulating a flight, employing a radio compass as a navigational aid, the said means including an indicator electro-mechanically operated under the control of the trainer to indicate deviation in the simulated flight of the trainer from a heading directly toward or away from an assumed radio compass transmitting station. The use of an automatically actuated radio compass indicator permits a simulated blind landing in the trainer to be accomplished in accordance with the Army Air Corps Blind Landing System when used in combination with some form of marker beacon simulating means.

The use of the radio compass simulating means in combination with a radio range signalling system for a flight trainer also affords a means for solving instrument navigation problems in a grounded flight trainer.

Aviation ground trainers for instructing students in the art of instrument flying are well known and in daily use. Such ground trainers generally comprise a structure resembling an aircraft tiltably and rotatably mounted on a base and controllable by the occupant in a manner similar to the control of an aircraft in flight, and suitable instruments are provided to indicate the various flight attitudes of the trainer. For a more complete description of one form of flight trainer, reference may be had to United States Patents No. 1,825,462 and No. 2,099,857 granted to Edwin A. Link, Jr.

In conjunction with aviation ground trainers of the type above described, it is usual to employ a course recorder for tracing the simulated flight course on a record sheet or map. The recorder generally comprises a frame movably supported on rollers so as to be capable of movement relative to the surface of the record map table. The rollers are steerable and are interconnected by gearing with a Selsyn receiver electrically connected to a Selsyn transmitter rotated by the trainer as it changes its azimuth heading. The arrangement is such that the recorder rollers are always controllably maintained with the same azimuth heading as the trainer. At least two of the rollers are provided with power driving means, such as small adjustable constant speed motors, so that the recorder may have a translatory motion over the record surface at a velocity proportional to the simulated velocity of flight of the trainer. One of the supporting rollers, when inked, serves as a marking means. For a more detailed description of one form of suitable course recorder, reference may be had to United States Patent No. 2,179,663 granted to Edwin A. Link, Jr.

In giving instruction in blind or instrument flying, the trainer and its course recorder are placed in operation, and an instructor watches the course of the recorder relative to the chart on the record table, on which the recorder marker wheel traces the recorder path. To simulate flying on a radio range, the instructor manually controls an electrical signalling system so as to give the student the proper "A," "N," or "On course" signal, depending on the location of the recorder relative to the simulated radio range drawn on the record chart. As the recorder approaches the simulated radio transmitter station point, the instructor must also manually control the signal volume and cut off the signals completely when the recorder is in the simulated zone of silence adjacent the radio range station point, and then must give the proper signal, with the proper intensity, as the recorder emerges from the zone of silence. One form of such a signalling system is illustrated in United States Patent No. 2,119,083, granted to Edwin A. Link, Jr.

A manually actuated radio compass simulating indicator for use with aviation ground trainers is known in the art, but the manual actuation of the radio compass indicating system in addition to the manual actuation of the radio range signalling system, in order to enable the student controlling the trainer to take radio compass bearings relative to the line of flight along the radio range, becomes a problem dependent on the dexterity of the instructor, with corresponding inaccuracy due to the personal factor.

In accordance with the invention the radio compass indicator known in the art is retained, but a novel mechanical means is employed for operating the radio compass potentiometer control automatically, allowing the instructor to control the radio range signalling system or to transmit weather reports. The radio compass may be used alone as a homing device, or the radio compass may be used in combination with a novel mechanically operated radio range signal control system disclosed and claimed in my copending application No. 319,498, filed February 17, 1940, now U. S. Patent 2,438,126, granted March 23, 1948.

In order to simulate a landing in accordance with the Army Air Corps Blind Landing System, in a flight trainer of the type above described, the student must be provided with a radio compass simulating means which is capable of simulating homing flight toward one of two aligned radio compass station points and, upon simulated arrival at the homing station, to alter the radio compass to home on the second station, whereby the simulated flight may be aligned with an assumed landing runway, the axis of which passes through the radio compass transmitter station points. At each assumed radio compass station point a means to simulate marker beacon transmitter signals must be employed, and after the student aligns the trainer with the assumed landing runway a simulated descent from predetermined simulated altitudes at each radio compass marker beacon and at predetermined simulated rates of descent along a glide path, terminating within definite limits on the assumed landing runway, may be made. The invention provides a novel means for altering the simulated radio compass homing point, utilizing the radio compass indicator according to the invention; and the shift in homing station points, being controlled by the student from the trainer cockpit in a manner equivalent to the tuning of the radio compass receiver in an actual airplane, enables the blind landing according to the Army Air Corps System, as above described, to be accomplished.

It is an object of this invention to provide, in aviation ground training apparatus, a mechanically actuated radio compass simulating signal system, responsive to change in the relative heading between a course recorder or indicator, directionally controlled by the trainer and a point on the record surface traversed by the recorder, whereby departure of the trainer from a simulated course directed towards a simulated radio compass homing station will be indicated.

A further object of the invention is the provision of a novel mechanical means controlled by a course recorder for an aviation ground trainer for actuating a simulated radio compass indicating system.

A further object of the invention is the provision of an electro-mechanical radio compass simulating means for an aviation ground trainer, responsive to departure of the simulated flight of said trainer from a course directed towards or away from one of a plurality of assumed radio compass transmitting station points, thereby causing an indication of said departure and means for selecting at will the assumed reference station point.

Another object of the invention is the provision in an aviation ground training system, of an aviation ground trainer for simulating the flight of an aircraft, a course recorder directionally controlled by the trainer and adapted to indicate the simulated flight course of the said trainer relative to a chart, of means for indicating the simulated flight of said trainer towards or away from an assumed radio compass transmitting station, controlled by the position of the course recorder relative to a point on the chart representing said station, and means for arbitrarily altering the reference station point on said chart to another assumed station point, whereby the simulated flight of said trainer may be aligned with the axis of a simulated landing runway, passing through said station points and marker beacon indicator simulating means mounted in said trainer and controlled by said recorder, when passing over the assumed station points on said chart, thereby enabling a simulated blind landing of said trainer to be accomplished in accordance with the Army Air Corps Blind Landing System.

Another object of the invention is the provision in an aviation ground training system, of an automatic simulated radio range signalling system actuated by a course recorder, directionally controlled by the trainer and a simulated radio compass indicating system automatically actuated by said recorder and simultaneously operable with said first-named signalling system.

Other objects will become apparent by reference to the specification and to the appended drawings in which:

Fig. 1 illustrates schematically a known form of manually controlled electric radio compass indicator for use with aviation ground trainers and employed in the invention;

Fig. 2 illustrates in side elevation a mechanical means for actuating the indicator of Fig. 1 by an aviation ground trainer course indicator, directionally controlled by the associated ground trainer;

Fig. 3 illustrates an enlarged view of a detail of the device of Fig. 2;

Fig. 4 illustrates a modification of the device of Fig. 2, wherein a desired one of a plurality of radio compass station points may be selected;

Fig. 5 illustrates a top plan view of the device of Fig. 4;

Fig. 7 illustrates a sectional view of a modified power means for shifting the radio compass station point in the device illustrated in Figs. 4 to 6, inclusive;

Fig. 8 illustrates, partly in section, a radio range signalling system actuated mechanically by the radio compass actuating means disclosed in Fig. 2; and Fig. 9 is a top plan view of the device illustrated in Fig. 8.

Fig. 10 is a plan view of a record chart showing the record of an instrument landing; and Fig. 11 is a side elevation of the record sheet of Fig. 10 illustrating schematically the simulated flight path of the ground trainer during a simulated instrument landing.

Figure 6:
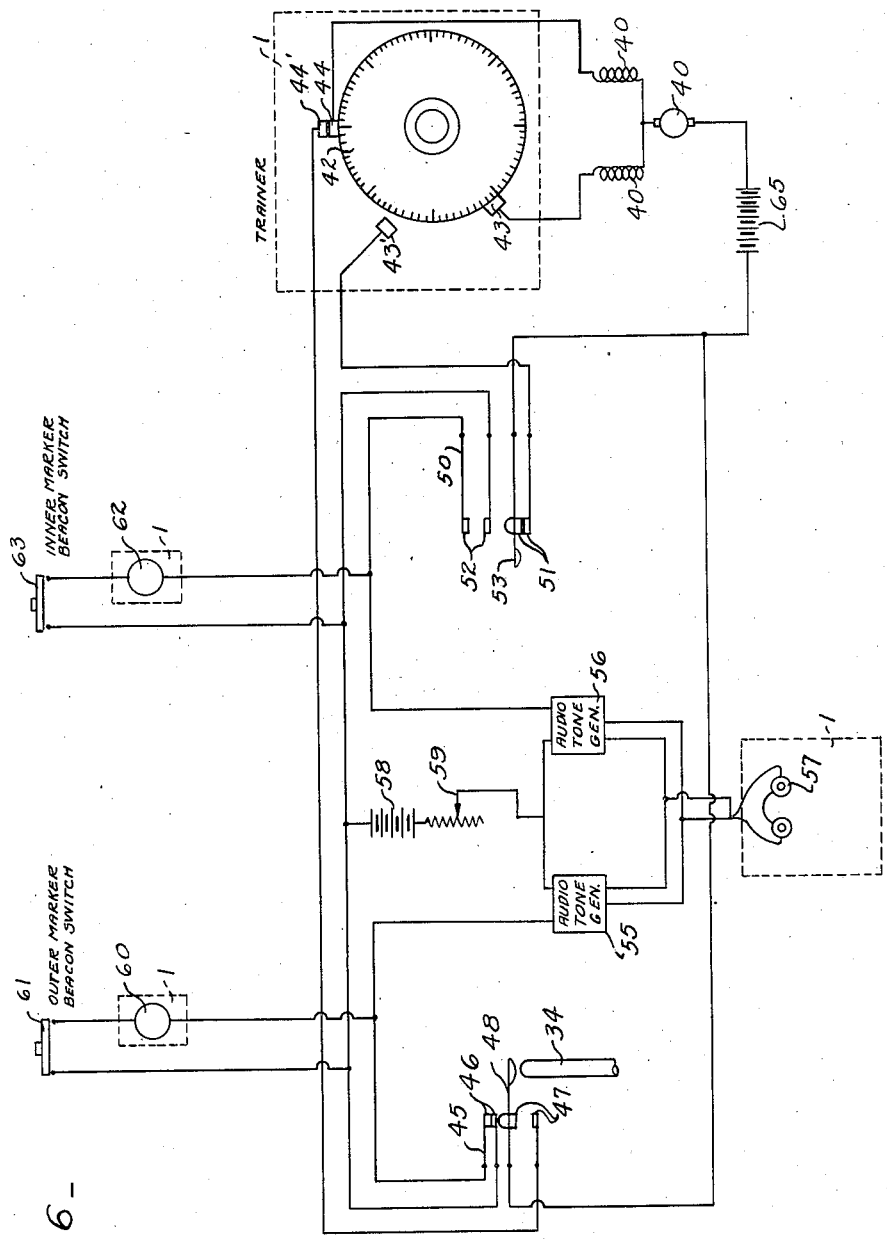
Fig. 6 illustrates an electric circuit diagram of the device of Figs. 4 and 5.

As seen in Fig. 1, there is illustrated a conventional radio compass indicating system now employed in conjunction with aviation ground trainers, and no claim is made thereto except in combination with other elements in a manner hereinafter described. The indicator comprises a potentiometer, generally indicated by the reference numeral 10, having a resistance winding 11, contacted by a rotatable contact arm 12, mounted on a shaft 13 for manual actuation. The positive and negative terminals of a battery 14 are connected by leads 15 and 16, respectively, to diametrically opposite points on the resistance winding 11, dividing the same into two equal branches. The battery is center tapped with a neutral wire 17, connected through a zero center galvanometer or voltmeter 18 to the rotatable contact arm 12. Suitable adjustable resistances 19 and 20 are provided for regulating the sensitivity of the indicator 18. The potentiometer 10 is normally mounted on the course recorder, and the resistor winding 11 is rotatably mounted on the recorder marker wheel shaft. The contact arm 12 is manually controlled by actuation of a sighting device secured to shaft 13, so that a line perpendicular to the plane of the contact arm 12 passes through the plane of a simulated radio compass transmitter station point on the record chart. If the course of the recorder is such that it is perpendicular to the contact arm and aligned with the line of sight, the current flow through the galvanometer 18 will be zero and the pointer will be centered, indicating that the recorder is moving directly toward the assumed radio compass station, while if the course of the recorder is to the right of the direct heading, the unbalance of resistance will cause a flow through the galvanometer to deflect the pointer towards the right, and a deviation to the left will cause a similar pointer deflection to the left. If the recorder is moving away from the assumed radio compass station, the pointer will move right for a deviation to the left and vice versa, giving information in this manner whether the simulated flight is towards or away from the radio compass station point. A reversing switch 21 may be used to reverse the direction of pointer movement.

The above-described indicator is used in its entirety in the structure of the radio compass according to the invention, as seen in Figs. 2 and 3. As seen in Fig. 2, the trainer schematically indicated by dotted lines at 1 directionally controls a course recorder 3, movable relative to a record table 2. The rotation of the trainer in azimuth causes rotation of the rotor in a selsyn transmitter S, electrically connected by conductors S₁ to a selsyn receiver S₂, which controls the directional heading of the marker roller 4 and driving rollers 6 of the recorder 3, which are driven by electric motors 7 at a speed proportional to the simulated velocity of the trainer. The potentiometer 10 has its resistance winding 11 secured adjacent the upper end of the supporting shaft 5 for the marker wheel 4, so as to rotate therewith. The resistance contact arm 12 is rigidly fixed to a sleeve 22, piloted on an extension of the shaft 5 and carrying a crosshead guide 24 upon its upper end, which slidably engages the side walls of an inverted U-shaped channel member 28. As seen in Fig. 3, the sleeve 22 is supported on the reduced diameter extension of the marker wheel shaft 5 by suitable ball bearings 23 so that the shaft 5 may rotate relative to the sleeve 22. The crosshead guide 24 is secured to the upper end of the sleeve 22 and has a rectangular portion fitting within the open portion of the inverted U-shaped channel member 28. The balls 25 may be used to reduce friction between the crosshead guide 24 and the inner walls of the channel 28. The crosshead 24 permits longitudinal movement of the sleeve 22 relative to the channel 28 but permits no rotation of the sleeve 22 relative to the channel member 28. The resistor contact arm 12 is non-rotatably mounted relative to the sleeve 22 on the lower end thereof and suitably electrically insulated from the sleeve. The contact arm 12 is mounted so as to make a fixed angle of ninety degrees with the longitudinal plane of the channel member 28, the contact arm 12 being shown out of its correct position in Fig. 2 for clearer illustration. The resistance winding 11 is mounted for rotation with the shaft 5 and is suitably insulated therefrom. The leads 15 and 16 are electrically connected to the resistance winding 11 through the medium of the usual slip rings and brushes, and the contact arm 12 is connected to lead 17, as shown.

Referring again to Fig. 2, the indicator 18, mounted in the trainer cockpit, and battery 14 are connected in exactly the same manner as indicated in the device of Fig. 1.

The channel member 28 is pivotally mounted by means of a pivot 29, in a guide block 30, which can be adjusted to a desired position along a slot 31 in an arm 32, adjustably mounted on a vertical support 33, secured to the record table 2. The channel member 28 and stationary arm 32 are arranged in parallel spaced relation to the surface of the record table 2. The vertical axis of the pivot 29 is adjustable so as to be directly over some desired point D on the record table surface, representing an assumed radio compass transmitting station, such as a commercial broadcasting station.

The operation of the device is as follows: Since channel member 28 is pivoted at 29, its longitudinal axis is always in a plane directed towards and away from the assumed radio compass transmitting station point D; and since contact arm 12 cannot rotate relative to the channel member 28 and maintains a fixed angle of ninety degrees with respect thereto, the operation of the contact arm 12 by the channel member 28 is exactly similar to the manual actuation of the contact arm 12 in the prior art device of Fig. 1 by the instructor, as previously described with reference to Fig. 1. The potentiometer winding 11, being rotatable by the marker wheel shaft 5, assumes a position depending on the instant heading of the recorder 3 controlled by the trainer 1. The radio compass indicator 18, mounted in the trainer cockpit, will indicate whether the instant trainer course is directly towards or away from the assumed radio compass station point D, in the same manner as in the manually controlled device of Fig. 1, without the intervention of the manual control by the instructor, who is thus free to give his attention to the progress of the simulated flight and control the sensitivity of the indication by means of an adjustable rheostat, such as 19 in the device of Fig. 1.

Since the crosshead guide 24 can move freely in a longitudinal direction relative to the channel member 28, which in turn is free to rotate, the recorder 3 is unimpeded in its translatory movement over the record table 2, and by the use of ball bearings, friction effects may be reduced to a negligible quantity.

The device illustrated in Figs. 4, 5, and 6 is a modification of the device illustrated in Figs. 2 and 3 for simulating blind landings in accordance with the Army Air Corps Blind Landing System. As above described, the Army Air Corps System employs two radio compass transmitters arranged at spaced points from a point on a landing runway, and alignment of the aircraft in descent with the landing runway is established by successively directing the flight towards the respective radio compass stations. In order to simulate the aligned radio compass stations used in the Army Air Corps System, the device of Figs. 2 and 3 is modified to provide a means to shift the pivot 29 from one predetermined position to another as desired. The recorder 3 is provided with a potentiometer assembly 10 actuated by the channel arm 28, rotatable about the pivot 29, in the same manner as in the device of Figs. 2 and 3, and similar parts are given the same reference numerals as in the device of Figs. 2 and 3. The pivot 29 is hollow and is carried in a suitable ball bearing (not shown) in the crosshead guide 30, which is slidable in the slot 31 of the arm 32, in the same manner as in the device of Figs. 2 and 3. The crosshead 30 carries a non-rotatable hollow extension 34, to which is secured a horizontal actuating rod 35, the other end of which is supported in a bearing guide 36, supported by the arm 32. The rod 35 has rack teeth 37 cut thereon, which are adapted to mesh with a pinion gear 38, mounted on the shaft 39 of a reversible electric servomotor 40, which drives the pinion through a friction clutch 41. The motor 40, when energized, can move the crosshead 30 and pivot pin 29 longitudinally between the limits of slot 31 in the arm 32, and thus the crosshead and pin can be shifted between the outer position, as shown, to the inner position, indicated in dotted lines in Figs. 4 and 5, or vice versa, so as to be directly over either the inner or outer station points, indicated in Figs. 4 and 5 as I or O on the record table surface. The motor control circuit, as seen in Figs. 4 and 6, includes a dial 42, mounted in the trainer cockpit and equivalent to a radio receiver dial and having two sets of contacts 43 and 44 thereon, which are adapted to contact stationary contacts 43' and 44' respectively. A double circuit contact switch 45 is mounted on arm 32 and has motor circuit contacts 47 and audio tone signal contacts 46 actuated by the flexible contact arm 48, which is normally deflected down to close the motor circuit contacts 47 and which is moved upward by engagement with the crosshead extension 34 when the crosshead is in the outer position, as seen in Fig. 4. A similar double circuit contact switch 50, having motor circuit contacts 51 and audio tone signal contacts 52 actuated by a flexible contact arm 53, is similarly mounted on arm 32, so that the motor circuit contacts 51 are normally closed and opened by engagement of contact arm 53 with the crosshead extension 34, when in the inner, or dotted line position, as seen in Fig. 4.

As seen in Fig. 6, with the extension 34 in the position shown, over the outer station point O, the flexible contact arm 48 is in contact with the extension 34, the motor circuit contacts 47 being open and the audio signal contacts 46 being closed, establishing a circuit from battery 58, volume control rheostat 59, to the audio tone generator 55, which may be of any suitable type, such as a buzzer or vacuum tube audio oscillator, to establish an audio signal in the headphones 57, worn by the student in the trainer 1, characteristic of the assumed radio compass station at O. The outer marker beacon signal lamp 60, also mounted on the trainer instrument board, can be energized when the marker beacon switch 61 is closed. If now the dial 42 is rotated clockwise, as seen in Fig. 6, contacts 43 and 43' will be closed, causing a circuit to be established through contacts 51, battery 65, and through the armature and one of the split field windings of motor 40, to energize the motor 40 to rotate in a direction such that rod 35 causes crosshead 30, with its associated pivot 29 and extension 34, to be moved horizontally toward the right, as seen in Fig. 6, to the inner station position I of Figs. 3 and 4. The extension 34 will then break the audio tone circuit by opening contacts 46; and motor control contacts 47 will close and, upon the extension 34 striking the contact arm 53, the contacts 51 will be opened, stopping the motor 40 and closing the audio tone contacts 52, which will connect the audio tone generator 56 in circuit with battery 58, volume control 59, and headphones 57, to give a signal identifying the assumed inner station at I and rendering marker beacon lamp 62 operative upon closure of switch 63. Upon counterclockwise rotation of dial 42 to engage contacts 44 and 44', the motor 40 will be reversed and cause crosshead 30 and stem 34 to return to the outer position, as seen in Fig. 6, de-energizing motor 40, upon extension 34 engaging contact arm 48 to break contacts 47. It is thus seen that the student, in rotating dial 42 to either contact position, simulates the tuning of a receiver to the signal radiated by a homing radio compass station, and the tone generator gives an audible signal simulating the signal received on the non-directional antenna used in conjunction with a radio compass loop antenna for tuning and station identification purposes. The pivot point for the radio compass potentiometer is also correctly located by the servomotor 40. The radio compass indicator thus gives correct indications of the course of the course recorder and the corresponding trainer course relative to a heading directly towards or away from the selected radio station point at O or I.

The marker beacon switches 61 and 63 are placed in the surface of the record table 2 and are adapted to be closed by contact with the marker roller 4 of the recorder 3 when the marker roller is directly over the assumed radio compass station points I and O.

To control the volume of the signal generated by the audio tone generators 55 and 56, a volume control resistance 59 is employed, as above noted with reference to Fig. 6, and as seen in Fig. 4, the volume control resistance unit 59 is mounted on an extension of the crosshead guide 36. A suitable cable drum 70 is secured to the shaft 71 of the volume control and is biased by a light spiral spring 72 (see Fig. 5), to rotate in a volume increasing direction. A light cable 73 is wound around the drum 70, and one end of the cable is secured thereto. The cable 73 is then passed through a rounded opening in the extension 34 and through the hollow pivot 29, over a small guide roller 74 mounted in the channel member 28, and the outer end is connected to the guide 24. The recorder 3, in moving radially with respect to the pivot 29, then actuates the volume control 59 to increase the volume of the audio tone generator 55 or 56 as the recorder moves inward, and to similarly decrease the volume as the recorder moves radially outward from the axis of pivot 29.

To accomplish a simulated blind landing in accordance with the Army Air Corps Blind Landing System above described, the student in the trainer rotates the dial 42 to simulate tuning in one of the stations at O or I aligned with the landing runway, preferably station I, and proceeds on a simulated homing flight until the marker beacon switch 63 flashes marker beacon signal lamp 62 in the trainer cockpit. The student then tunes in on station O and, watching the radio compass indicator 19, proceeds to station O, and by a proper known procedure in one or more traverses the student aligns the trainer course parallel with a line drawn through O and I and sets a directional gyro compass simulating means and proceeds to descend from a given altitude at a constant rate. When the recorder 3 passes over the outer station point O, beacon lamp 60 will flash, and the radio compass dial 42 is set to the inner station at I, and the directional gyro is set. The trainer is then aligned with the simulated landing runway and descending at a predetermined constant rate, and the flashing of lamp 62 indicates the passing of the field boundary, a point used as an altitude checking point. The directional gyro now serves as the directional guide and the descent continues until the altimeter reads zero, indicating that a simulated contact with the ground has been made; and if desired, the altimeter may be connected to a signal device or may switch off the trainer power supply to indicate contact with the ground and to serve as a check on whether the landing occurred within the proper limits of the simulated landing field and aligned with the simulated landing runway.

Fig. 7 illustrates a modification of the device of Figs. 4 to 6 inclusive, in which a solenoid servomotor means is used to replace the reversible electric motor 40. The rod 35 is made of brass and has a core section 35' made of soft iron. The rod 35 passes through a pair of spaced solenoid coils 80 and 81. The iron core section 35' is arranged such that when wholly within one solenoid coil, a portion of the core will extend within the other coil. The solenoid coils 80 and 81 are connected to battery 65 and contacts 43' and 44' in the same manner as the field coils of motor 40 (Fig. 6) are connected. When solenoid 80 is energized, the iron core 35' will be pulled within the solenoid coil 80, while if solenoid coil 81 is energized, the core 35' will be pulled in the reverse direction into solenoid coil 81. The solenoids thus act to shift rod 35 in the same manner as motor 40 shifts the rod 35 in modification Figs. 4 to 6 inclusive.

Fig. 8 illustrates a modification similar in all respects to the modification illustrated in Figs. 2 and 3 with the exception that the channel member 28 and pivot pin 29 are also used to actuate the signal control potentiometer of a known type signal generator used with aviation ground trainers to simulate the "A," "N," and "On course" signals of a radio range. The pivot pin 29 is hollow and suitably mounted for rotation in a ball bearing carried by crosshead 30. The pivot 29 carries a gear 90 which meshes with a pinion gear 91, supported on a pivot 92, mounted on an elongated plate 30', forming part of the crosshead 30. The gear 91 has one-half as many teeth as gear 90, so that it will revolve through one hundred eighty degrees for ninety degrees of revolution of gear 90. The gear 91 has a vertical crank pin 93 mounted thereon, which engages a slot 94 at one end of a lever 95, pivotally mounted at 96 and having an arcuate gear sector 97 secured to the outer end thereof. The gear sector 97 engages a pinion gear 98, mounted on the shaft 99 of a radio range signal control potentiometer 100. The potentiometer is adapted to control in a known manner a radio range signal generator 101 of known construction, to transmit the well-known "A," "N," or continuous "On course" signal to receiving headphones 102, mounted in the cockpit of the trainer 1.

By reference to Fig. 9 the radio range "On course" signal legs and the "A" and "N" signal zones are indicated, and if the recorder 3 under the directional control of the trainer 1 rotates the arm 28 clockwise into the "N" signal quadrant, the gear 90 will rotate gear 91 counterclockwise, causing arm 95 and gear sector 97 to rotate gear 98 and potentiometer 100 from the "On" position to the "N" signal position, which will cause the signal generator 101 to transmit the "N" signal to the headphones 102, suppressing the "A" signal into the background. Continued rotation of gear 90 will finally cause reversal of the direction of rotation of gear 98, due to the crank pin connection 93—94, until the potentiometer is again in the "On" position, causing both "A" and "N" signals to be successively transmitted to headphones 102 with equal intensity, causing the illusion of a continuous signal, indicating that the recorder is in the "On course" signal zone. No matter where the recorder 3 is located, the proper signal will be given.

In order to control the signal volume as the recorder 3 approaches the axis of pivot 29, a cable 103 is secured at one end to the guide 24, which is longitudinally movable in the channel member 28, as heretofore described. The cable 103 passes over a guide roller 104 and passes through the hollow pivot 29 and over a guide pulley 105, mounted on a swivel head 106, carried by the outer end of pivot 29. The cable 103 then passes around a cable drum or pulley 107, and its end is secured thereto. The drum 107 is mounted on a shaft 108 of a volume control rheostat 109, mounted on the plate 30' of crosshead 30. The shaft 108 and drum 107 are biased to move in the volume-increasing direction by a light spiral spring 110, one end of which is secured to the shaft 108 and the other end secured to the casing of volume control rheostat 109. The volume control rheostat 109 controls the filament circuits of the amplifier tubes employed in the signal generator 101 to cause an increase or decrease of signal volume. The signal volume is increased as the recorder approaches the axis of pivot shaft 29, and decreased as the recorder moves radially outward from the axis of pivot shaft 29.

The construction of the mechanically operated radio range signalling system, per se, forms part of the subject matter of my aforementioned application No. 319,498, filed February 17, 1940.

The radio compass indicating system, including the indicator 13, is controlled by rotation of the arm 21 about the axis of pivot 29 in exactly the same manner as heretofore described with reference to modification Figs. 2 and 3.

The novel feature of the arrangement illustrated in Figs. 8 and 9 is the fact that a common operating means is used to actuate both the radio range and radio compass simulating signal systems, whereby either system may be used independently, or both radio navigational aids may be used simultaneously, the radio compass permitting a direct course toward the range station point to be simulated after getting on an "On course" signal leg of the simulated radio range, and also permitting a gyro compass to be set on a direct heading toward the radio range station point.

Fig. 10 illustrates the type of record made by the course indicator in executing an instrument landing in accordance with the procedure outlined above with reference to the description of Figs. 4 to 6 inclusive, and Fig. 11 illustrates schematically the various maneuvers and simulated flight of the trainer during an instrument landing. The two figures are considered together in the following description.

The record sheet or chart R has drawn thereon a plurality of concentric circles spaced apart such that a radial distance of about seven-eighths of an inch between adjacent circles represents a scale distance of one-half mile for an assumed trainer cruising velocity of one hundred twenty miles per hour. The velocity of the course indicator 3 is increased fourfold over the speed ordinarily used in orientation problems in order to open up the problem to a scale such that an adequate distance between the inner and outer station points O and I will be possible. The speed of the course indicator may be readily varied by replacing the motors 7 by similar motors having a smaller ratio speed-reduction gearing or by use of a frequency-changing device so that the rollers 6 will be driven at the proper speed.

Assuming that the course indicator 3 and the associated trainer are placed in operation and that the course indicator moves from a scale distance of 25 miles or more toward the inner radio compass station I, the recorder will be tracing a line such as $a-f$ and after passing over the inner radio compass station a turn is made, causing the recorder to trace the turn $b-c$, and the recorder is again headed for the inner station I. As soon as the station I is again reached, the student in the trainer times in to the outer station O in the manner above described and proceeds toward O. Upon reaching station O he makes a procedure turn such as indicated by the reference characters $d-e$, and the course indicator returns through station O. The inner station I is then immediately tuned in and the directional gyro, forming a part of the standard equipment of the trainer, is set. At this time the altimeter should read approximately 800 feet. The descent is then started along the trace $e-f$ at a predetermined rate of descent, controlled by the trainer flight attitude and throttle setting, and when the recorder passes over station I, the altimeter should read 150 feet. The simulated descent then proceeds until the altimeter reads zero, at which time the student in the trainer gives a signal by raising the hood, or a signal operated by the altimeter may be employed. The position of the marker wheel of the course indicator is then marked on the chart by the instructor and should be at point $g$, within the limits of the landing runway. Faulty procedure in the glide is immediately apparent from the record sheet, as to directional control as well as proper descent, since point $g$ may be easily determined and marked on the record sheet and compared with the point of contact which would result if the entire descent were made in a correct manner. The theoretical simulated flight path corresponding to the correct instrument landing, is illustrated in Fig. 11.

As seen in Fig. 11, the distance, $y$, of the inner station is made to represent a distance of approximately 1500 feet from the end of the landing runway, while the outer station O is made to represent a distance, $x$, of two miles on the chart from the inner station I. The particular altitudes at station O and station I are determined by the characteristics of the airplane being simulated, as is also the desired rate of descent, which will vary with different types of aircraft. The student, therefore, is thoroughly instructed beforehand as to the proper altitude at stations O and I, and the proper air speed and engine revolutions necessary to achieve a glide at the proper rate of descent. The rate-of-climb indicator also serves to indicate the proper rate of descent. In order to check the altitude at different points in the descent, the student may call out the altitudes over the interphone communication system in even units of one hundred feet, or fractions thereof, during the descent; and the instructor may mark the corresponding position of the marker wheel of the recorder and the altitude. From this data it is easy to plot the actual simulated path of the descent and to check the rate of descent at various points in the glide.

While several forms of the invention have been illustrated, it will become apparent to those skilled in the art that other modifications may be made falling within the scope of the invention as defined by the appended claims.

I claim:

1. In combination an aviation ground trainer for simulating the flight of an aircraft, a reference surface, a course indicator movable relative to said surface at a velocity proportional to the simulated velocity in flight of said aircraft and directionally controlled by said trainer, a signalling system for simulating a radio compass giving directional information of the heading of said course indicator relative to a point on said reference surface representing an assumed radio compass transmitting station, a control means for said signalling system including a first element rotated by said course indicator in accordance with the directional changes thereof and a second element rotatable relative to said first element, relative rotation between said elements controlling said signalling system, an arm, a pivotal mounting for said arm, the pivotal axis of which in one position interesects said reference surface at said point, means operative at will for shifting said pivotal mounting for said arm to a second position such that said pivotal axis intersects said reference surface at a second point representing a second assumed radio compass transmitting station aligned with said first point, means mounted in said trainer for selectively controlling the shifting means and a sliding connection between said second element and said arm.

2. The structure as claimed in claim 1, including a station identifying signal generating means, signal receiving means connected to said signal generating means, means for causing said signal generating means to transmit signals of one station identifying character to said receiving means when said pivot mounting is in said one position and means for causing said signal generating means to transmit signals of a different station identifying character to said receiving means when said pivot mounting is in said second position.

3. The structure as claimed in claim 1, including a station identifying signal generating means, signal receiving means connected to said signal generating means and located in the cockpit of said trainer, means to cause said signal generating means to transmit signals of one station identifying character to said signal receiving means when said pivot mounting is in said one position, means for causing said signal generating means to transmit signals of a different station identifying character to said signal receiving means when said pivot mounting is in said second position and means for controlling the signal volume in accordance with the radial distance of said sliding connection from said pivotal axis in each of said one and said second positions of said pivot mounting.

4. The structure as claimed in claim 1, in which marker beacon simulating means are provided for signalling the arrival of said course indicator at each of said radio station points on said reference surface including a marker beacon signal means for each station mounted in said trainer, an electric circuit for energizing each of said marker beacon signal means, a switch in each circuit operative when said pivot mounting is in one of its predetermined positions and a second switch in each circuit operatively engaged by said course indicator when located at one of said radio station points on said reference surface, simultaneous closure of each of said switches in a respective circuit causing actuation of the respective associated marker beacon signal, whereby a simulated blind trainer landing along a simulated landing runway parallel with a line passing through said radio compass station points on said reference surface may be accomplished in accordance with the Army Air Corps Blind Landing System.

5. In an aviation ground training system, an aviation ground trainer universally pivotally mounted for movements simulating those of the flight of an aircraft, a reference chart surface, a course indicator movable relative to said reference surface at a velocity proportional to the simulated velocity of said aircraft and directionally controlled by the movement of said trainer, a radio compass simulating means including an indicator for indicating departure of said trainer from a heading directed towards or away from an assumed radio compass transmitting station, and means actuated by said course indicator for controlling the indication of said radio compass indicator.

CARL W. MULLER.

REFERENCES CITED

The following references are of record in the file of this patent:

UNITED STATES PATENTS

| Number | Name | Date |
| --- | --- | --- |
| 1,825,462 | Link | Sept. 29, 1931 |
| 2,099,857 | Link | Nov. 23, 1937 |
| 2,110,869 | Crane | Mar. 15, 1938 |
| 2,119,083 | Link | May 31, 1938 |
| 2,164,412 | Koster | July 4, 1939 |
| 2,179,663 | Link | Nov. 14, 1939 |
| 2,226,726 | Kramer | Dec. 31, 1940 |
| 2,438,126 | Muller | Mar. 23, 1948 |
| 2,444,477 | Stout | July 6, 1948 |

OTHER REFERENCES

Aeronautics Bulletin No. 27, Dept. of Commerce, July 1, 1937, pages 26–29.